United States Patent
Xing et al.

(10) Patent No.: US 10,776,289 B2
(45) Date of Patent: Sep. 15, 2020

(54) I/O COMPLETION POLLING FOR LOW LATENCY STORAGE DEVICE

(71) Applicant: Microsoft Technology Licensing, LLC, Redmond, WA (US)

(72) Inventors: Xiaozhong Xing, Bellevue, WA (US); Liang Yang, Sammamish, WA (US); Danyu Zhu, Redmond, WA (US); Robin Andrew Alexander, Woodinville, WA (US); HoYuen Chau, Bellevue, WA (US); Vishal Jose Mannanal, Renton, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/168,133

(22) Filed: Oct. 23, 2018

(65) Prior Publication Data

US 2020/0097419 A1     Mar. 26, 2020

Related U.S. Application Data

(60) Provisional application No. 62/734,390, filed on Sep. 21, 2018.

(51) Int. Cl.
*G06F 9/48*        (2006.01)
*G06F 13/16*     (2006.01)

(52) U.S. Cl.
CPC ........ *G06F 13/1668* (2013.01); *G06F 9/4881* (2013.01)

(58) Field of Classification Search
CPC .................................................... G06F 9/4881
See application file for complete search history.

(56) References Cited

U.S. PATENT DOCUMENTS

| | | | |
|---|---|---|---|
| 5,488,713 A | | 1/1996 | Norton et al. |
| 6,138,176 A | * | 10/2000 | McDonald .............. G06F 3/061 |
| | | | 710/241 |
| 6,195,715 B1 | | 2/2001 | Hoge et al. |
| 6,434,630 B1 | | 8/2002 | Micalizzi et al. |
| 7,853,960 B1 | | 12/2010 | Agesen et al. |

(Continued)

FOREIGN PATENT DOCUMENTS

EP        8388934 A1     10/2018

OTHER PUBLICATIONS

"Creating a Passive-Level Interrupt", Microsoft, Apr. 20, 2017 (Year: 2017).*

(Continued)

*Primary Examiner* — Farley Abad
(74) *Attorney, Agent, or Firm* — Buckley, Maschoff & Talwalkar LLC

(57) ABSTRACT

An I/O processing system includes reception of a request to perform an I/O operation from a user-mode application, providing of the request to a storage device, scheduling of an operating system deferred procedure call to determine whether the storage device has completed the I/O operation, execution of the scheduled deferred procedure call to determine that the storage device has completed the I/O operation, and transmission of a return corresponding to the completed I/O operation to the user-mode application.

17 Claims, 13 Drawing Sheets

(56) References Cited

U.S. PATENT DOCUMENTS

| | | | | |
|---|---|---|---|---|
| 8,588,228 | B1* | 11/2013 | Onufryk | G06F 13/24 370/389 |
| 2002/0144004 | A1* | 10/2002 | Gaur | G06F 9/547 719/310 |
| 2010/0138626 | A1 | 6/2010 | Lynn et al. | |
| 2010/0274940 | A1 | 10/2010 | Ahmad et al. | |
| 2011/0179417 | A1 | 7/2011 | Inakoshi | |
| 2012/0303842 | A1* | 11/2012 | Cardinell | G06F 13/28 710/22 |
| 2013/0024875 | A1 | 1/2013 | Wang et al. | |
| 2014/0101392 | A1* | 4/2014 | Stern | G06F 3/061 711/154 |
| 2017/0300228 | A1 | 10/2017 | Gollapudi et al. | |
| 2018/0095675 | A1 | 4/2018 | Kachare et al. | |
| 2018/0120918 | A1* | 5/2018 | Kwon | G06F 1/3253 |
| 2020/0125504 | A1 | 4/2020 | Alexander et al. | |

OTHER PUBLICATIONS

"Non Final Office Action Issued in U.S. Appl. No. 16/168,039", dated Sep. 27, 2019, 18 Pages.

Nakajima, et al., "Effective I/O Processing with Exception-Less System Calls for Low-Latency Devices", In Proceedings of the Third International Symposium on Computing and Networking, Dec. 8, 2015, pp. 604-606.

"International Search Report and Written Opinion Issued in PCT Application No. PCT/US2019/039110", dated Oct. 7, 2019, 13 Pages.

Jayasekara, Deepal, "Handling IO—NodeJS Event Loop—Part 4", Retrieved from: https://blog.insiderattack.net/handling-io-nodejs-event-loop-part-4-418062f917d1, Nov. 26, 2017, 14 Pages.

"International Search Report and Written Opinion Issued in PCT Application No. PCT/US19/029028", dated Jan. 7, 2020, 11 Pages.

* cited by examiner

I/O COMPLETION POLLING FOR LOW LATENCY STORAGE DEVICE

CROSS-REFERENCE TO RELATED APPLICATION

The present application claims priority under 35 U.S.C. § 119(e) to U.S. Provisional Patent Application Ser. No. 62/734,390, filed Sep. 21, 2018, the contents of which are incorporated by reference herein for all purposes.

BACKGROUND

Storage devices currently utilize interrupts to process I/O requests received from user-mode applications. For example, after completing a requested I/O operation, a storage device generates an interrupt which is transmitted to its host computer. The operating system of the host computer receives the interrupt and dispatches it to a kernel-mode interrupt handler, which identifies the corresponding I/O request and completes the request by providing an appropriate response to the requesting application.

The proportion of I/O processing time attributable to the above process may be unacceptable in systems which use modern Solid-State Drives or other low-latency storage devices, particularly under intensive I/O workloads. These issues are exacerbated in a virtualized environment, where the interrupt generated by the storage device must be delivered to a physical CPU, to a Hypervisor layer, and then to a virtual CPU.

Moreover, a low latency storage device may be capable of delivering its I/O interrupts to only a limited number of CPUs. Consequently, the CPUs which receive the I/O interrupts may become saturated before the storage device reaches its maximum throughput.

Systems are desired to process incoming I/O requests without using hardware interrupts and while providing reduced latency and increased throughput.

DETAILED DESCRIPTION

The following description is provided to enable any person in the art to make and use the described embodiments. Various modifications, however, will remain readily-apparent to those in the art.

Conventional I/O processing protocols present a technical problem of excessive processing overhead when used in conjunction with low-latency storage devices. Some embodiments provide a technical solution to this technical problem by scheduling a Deferred Procedure Call to poll for I/O completion. This solution may reduce I/O latency and provide consistent I/O throughput from low-latency storage devices on a host machine or in a virtualized environment.

According to some embodiments, the Deferred Procedure Call is scheduled to run in the context of the requested I/O operation. The Deferred Procedure Call therefore does not require a dedicated thread, and is more efficient than a multi-threaded approach.

Some embodiments may reduce CPU usage by scheduling a Deferred Procedure Call only if outstanding I/O requests to the storage device are present.

The scheduled Deferred Procedure Call is a Threaded Deferred Procedure Call according to some embodiments. A Threaded Deferred Procedure Call runs at PASSIVE IRQL level and can therefore be preempted by higher-level tasks. Since the operating system is aware of Threaded Deferred Procedure Call operation, tasks of the same priority level may be scheduled to other CPUs as needed. The use of Threaded Deferred Procedure Calls may therefore improve system integration of the present embodiments.

Scheduling the Deferred Procedure Call on the CPU from which the I/O request was received may effectively limit the I/O submission queue depth to one, thereby reducing I/O throughput in a single-threaded, high queue depth from application. Accordingly, some embodiments schedule the Deferred Procedure Call on a counterpart Simultaneous Multi-Threading processor of the I/O-initiating CPU. As a result, embodiments may achieve an improved balance between low latency and high throughput in different deployment scenarios.

Figure 1:
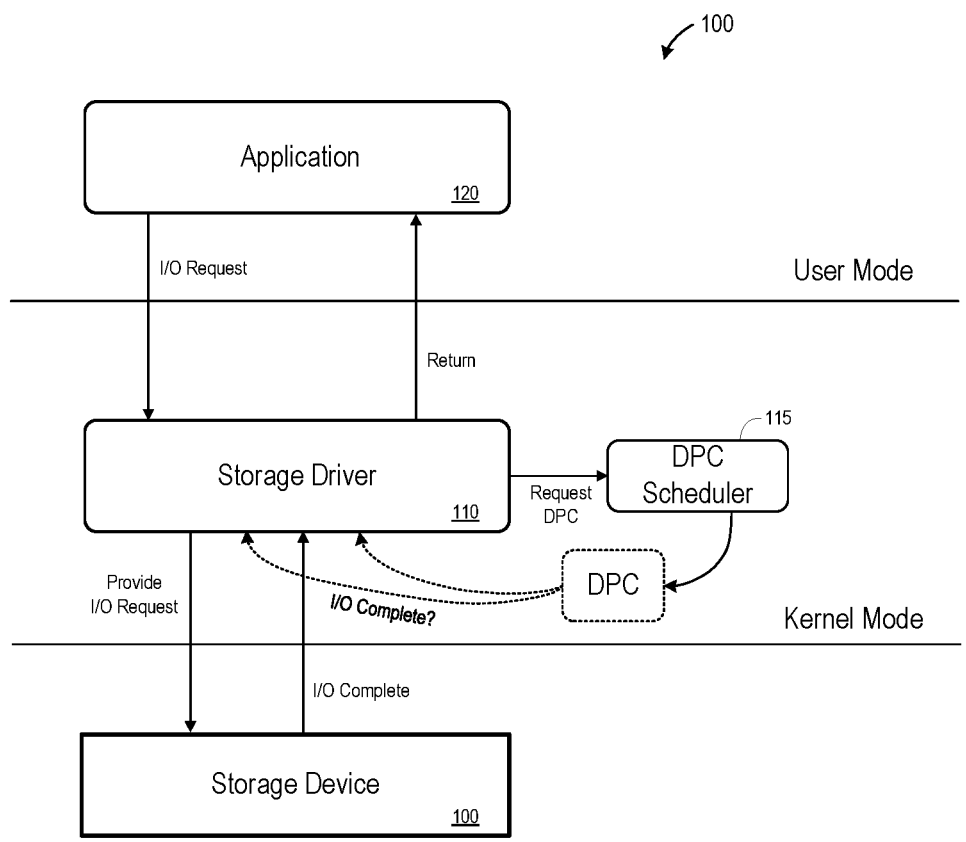
FIG. 1 illustrates a system implementing I/O completion polling according to some embodiments.

FIG. 1 illustrates system 100 according to some embodiments. Embodiments are not limited to system 100 or to any particular implementation described herein. System 100 includes storage device, which may comprise any electronic storage medium or media that is or becomes known. In some embodiments, storage device 100 comprises one or more non-volatile random access memory devices. Storage device 100 may exhibit I/O latency and throughput characteristics similar to volatile random access memory and significantly more favorable than those provided by disk-based storage.

Storage device 100 is illustrated in communication with storage driver 110. Storage driver 110 is shown as executing kernel mode of a host operating system. Storage driver 110 comprises executable program code providing an interface between storage device 100 and other software components within or executed by the operating system. Storage driver 110 may comprise a single storage driver or multiple layers of storage drivers in an operating system.

Application 120 may comprise any user-mode software application executing on the host operating system. According to some embodiments, application 120 comprises a user-mode application executed in a virtual machine or in a host operating system. Application 120 may request I/O operations and receive indications of completed I/O operations from storage driver 110.

A brief description of the operation of system 100 according to some embodiments now follows. Application 120 may transmit an I/O request to read data from or write data to storage device 100. The I/O request is received by storage driver 110 due to an association between storage driver 110 and storage device 100. In some embodiments, the I/O request is received from application 120 by an operating system component such as an I/O manager prior to being passed to storage driver 110. In this regard, the I/O request may pass through several drivers and/or components of an operating system stack prior to reaching storage driver 110.

Storage driver 110 provides the I/O request to storage device 100 via protocols known in the art and described in detail below. Storage driver 110 also sends a request to Deferred Procedure Call scheduler 115, a kernel component, to schedule a Deferred Procedure Call. The schedule Deferred Procedure Call is added to the end of a DPC queue to be executed in kernel mode by the operating system kernel. In particular, when the operating system drops to an IRQL of the scheduled Deferred Procedure Call, the kernel executes any Deferred Procedure Calls in the queue until the queue is empty or until the occurrence of an interrupt with a higher IRQL.

The scheduled Deferred Procedure Call invokes a routine to determine whether the requested I/O operation has been completed. If the operation is complete, the request is completed to application 120. If not, or if another I/O request is outstanding to storage device 100, the Deferred Procedure Call is again scheduled as described above. FIG. 1 illustrates a scenario in which the Deferred Procedure Call is first executed to determine that the I/O operation has not been completed, is rescheduled, and is then executed to determine that the I/O operation has been completed. The request is then completed to application 120, as illustrated by the arrow from storage driver 110 to application 120 labeled "Return".

Figure 2:
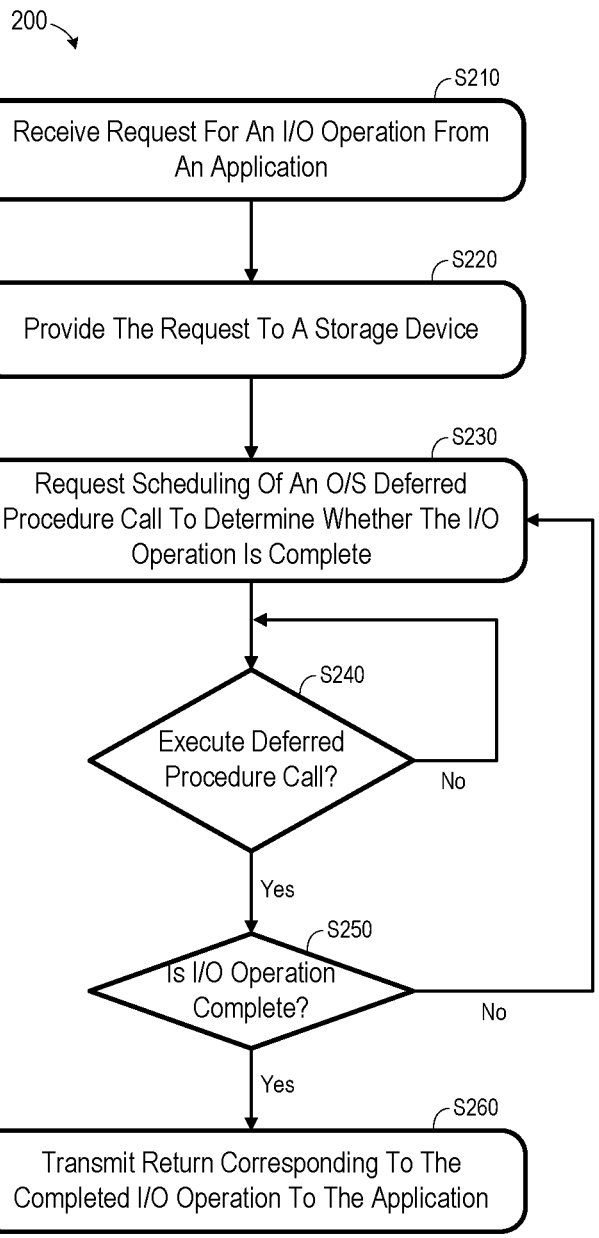
FIG. 2 is a flow diagram of a process to provide I/O completion polling according to some embodiments.

FIG. 2 comprises a flow diagram of process 200 according to some embodiments. In some embodiments, processing units (e.g., one or more processors, processing cores, processor threads) of a computing device (e.g., a computer server) execute software program code to cause the device to perform process 200. Process 200 and all other processes mentioned herein may be embodied in processor-executable program code read from one or more of non-transitory computer-readable media, such as a hard disk, a Flash drive, etc., and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a request for an I/O operation (i.e., an I/O request) is received from an application. According to some embodiments, the request is transmitted from a user mode application such as application 120, received by an operating system component, and is routed to a device driver stack corresponding to the hardware device associated with the I/O request. In the present example, it will be assumed that the I/O request is associated with storage device 100 and is therefore routed to and received by storage driver 110 at S210.

Next, at S220, the I/O request is provided to the storage device. According to some embodiments, providing the I/O request to storage device 100 comprises writing the I/O request into a submission queue of storage device 100.

Figure 3:
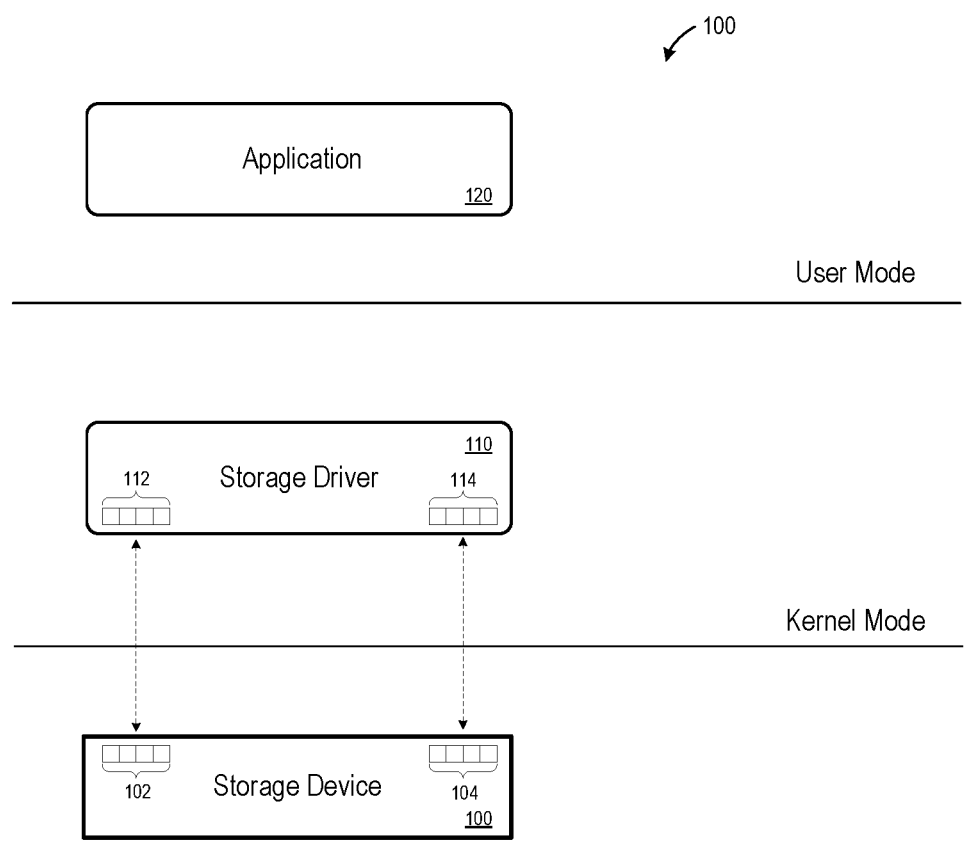
FIG. 3 illustrates driver queues and corresponding device queues according to some embodiments.

FIG. 3 illustrates the association of submission queues according to some embodiments. During initialization of storage driver 110 (e.g. at system power-on), submission queues 112 (i.e., memory buffers) are allocated for storage driver 110. Moreover, each of queues 112 is associated with one of submission queues 102 (i.e., hardware registers) created within storage device 110. Similarly, completion queues 114 for storage driver 110 are allocated, each of which is associated with one of completion queues 104 created within storage device 110. Each of queues 102, 104, 112 and 114 includes four queues, that is, each illustrated box represents a distinct queue.

Figure 4:
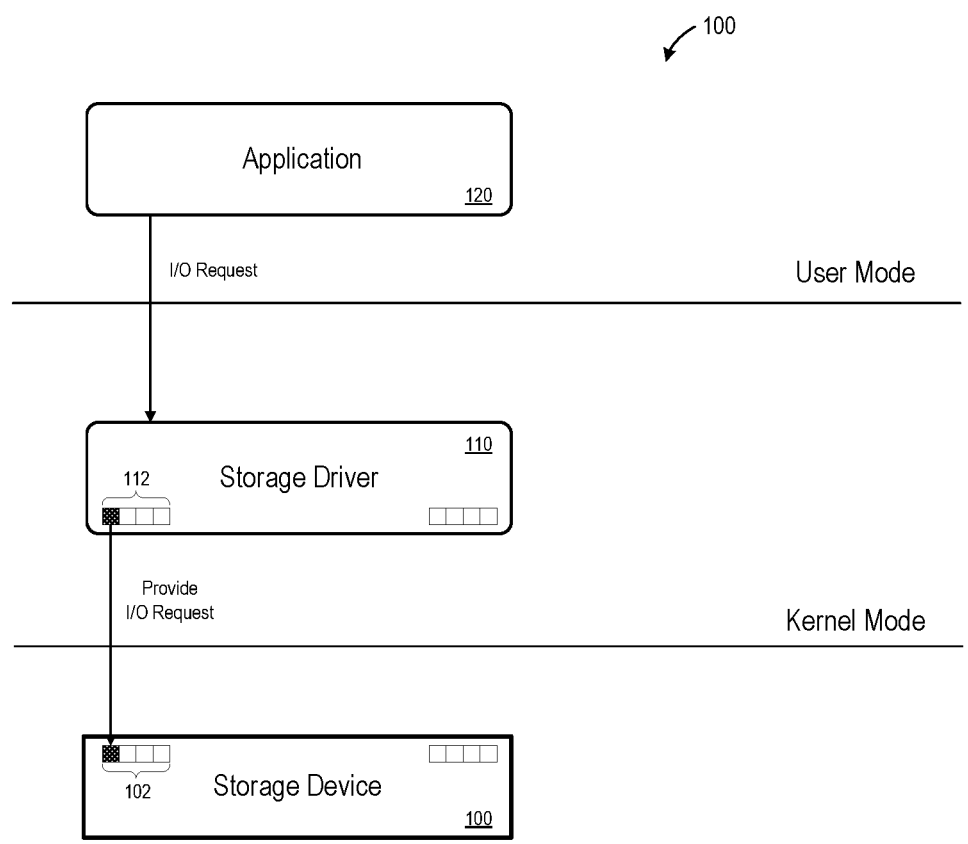
FIG. 4 illustrates reception of an I/O request and providing an I/O request to a storage device according to some embodiments.

According to some embodiments of S220, the I/O request is received at a submission queue 112 of storage driver 110 and then written into the corresponding submission queue 102 (i.e., device memory) of storage device 100. FIG. 4 illustrates S210 and S220 according to some embodiments. Writing of the request into the corresponding submission queue 102 of storage device 100 and signaling to storage device 100 that the request is ready for execution triggers storage device 100 to begin execution of the requested I/O operation.

In some embodiments, the submission queue 112 (and resulting submission queue 102) to which the I/O request is written depends upon the CPU from which the I/O request was received. For example, a CPU ID-to-submission queue table may be used to determine the submission queue 102 to which the request will be written. Upon receiving a request from a CPU, the table is checked to determine a submission queue associated with an ID of the CPU. If no table entry exists for the CPU ID, an entry is created. The association of submission queues with particular CPUs may assist in load balancing the I/O requests among all the submission queues 102.

Figure 5:
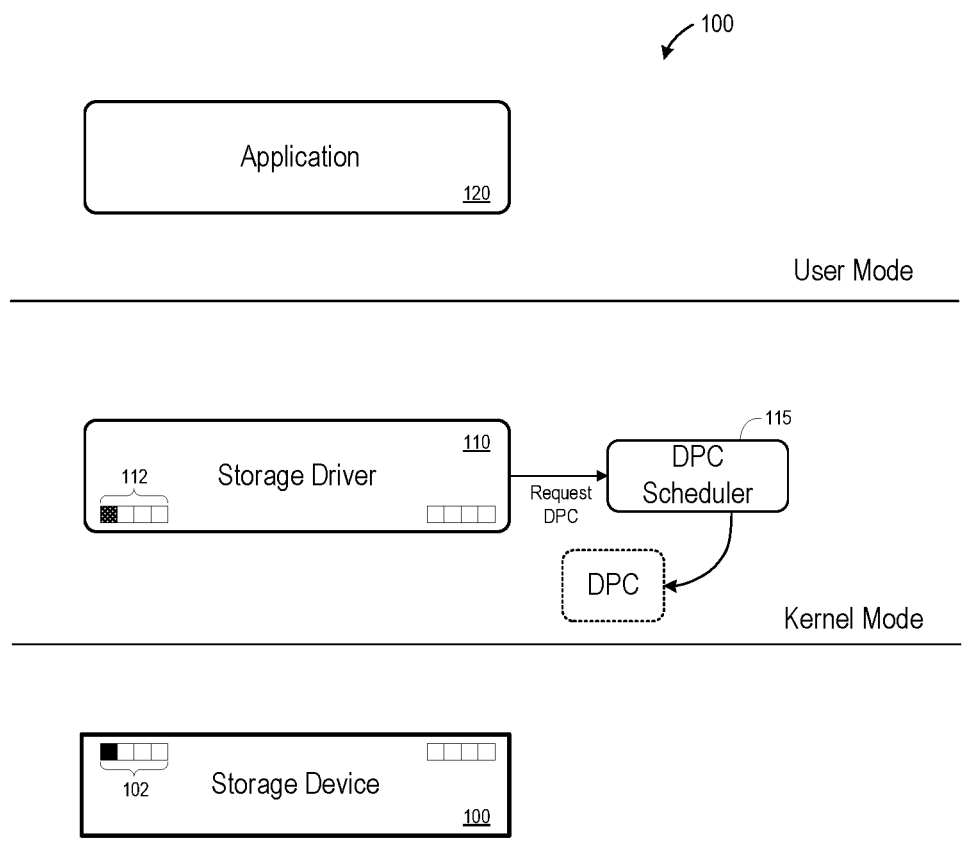
FIG. 5 illustrates scheduling of a Deferred Procedure Call according to some embodiments.

Next, at S230, scheduling of a Deferred Procedure Call is requested. As illustrated in FIG. 5, storage driver 110 may send a request to Deferred Procedure Call scheduler 115 to schedule a Deferred Procedure Call to determine whether the requested I/O operation is complete. The request may indicate the submission queue 112 to which the I/O request was written.

The schedule Deferred Procedure Call is added to the end of a DPC queue, and is to be executed in kernel mode by the operating system kernel when the operating system drops to an IRQL of the scheduled Deferred Procedure Call. The scheduled Deferred Procedure Call may comprise a Threaded Deferred Procedure Call which runs at PASSIVE IRQL level in some embodiments. Such an arrangement may reduce CPU usage by I/O processing while maintaining suitable latency and throughput.

According to some embodiments, the request to schedule the Deferred Procedure Call may also indicate a simultaneous multi-threading processor to execute the Deferred Procedure Call. The simultaneous multi-threading processor may be determined based on a mapping between CPUs and counterpart simultaneous multi-threading processors. The simultaneous multi-threading processor indicated within a request to schedule a Deferred Procedure Call may therefore be determined based on the mapping and on the CPU from which the I/O request was received. A separate Deferred Procedure Call queue may be established for each CPU/simultaneous multi-threading processor.

Figure 6:
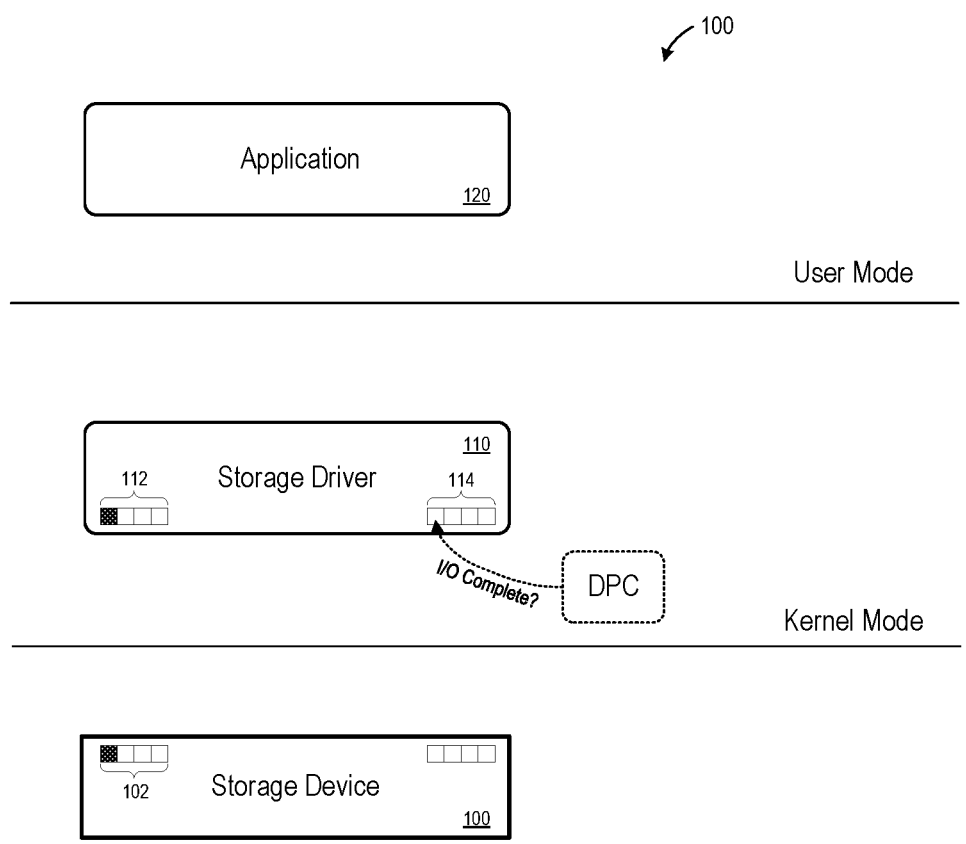
FIG. 6 illustrates operation of a Deferred Procedure Call according to some embodiments.
Figure 7:
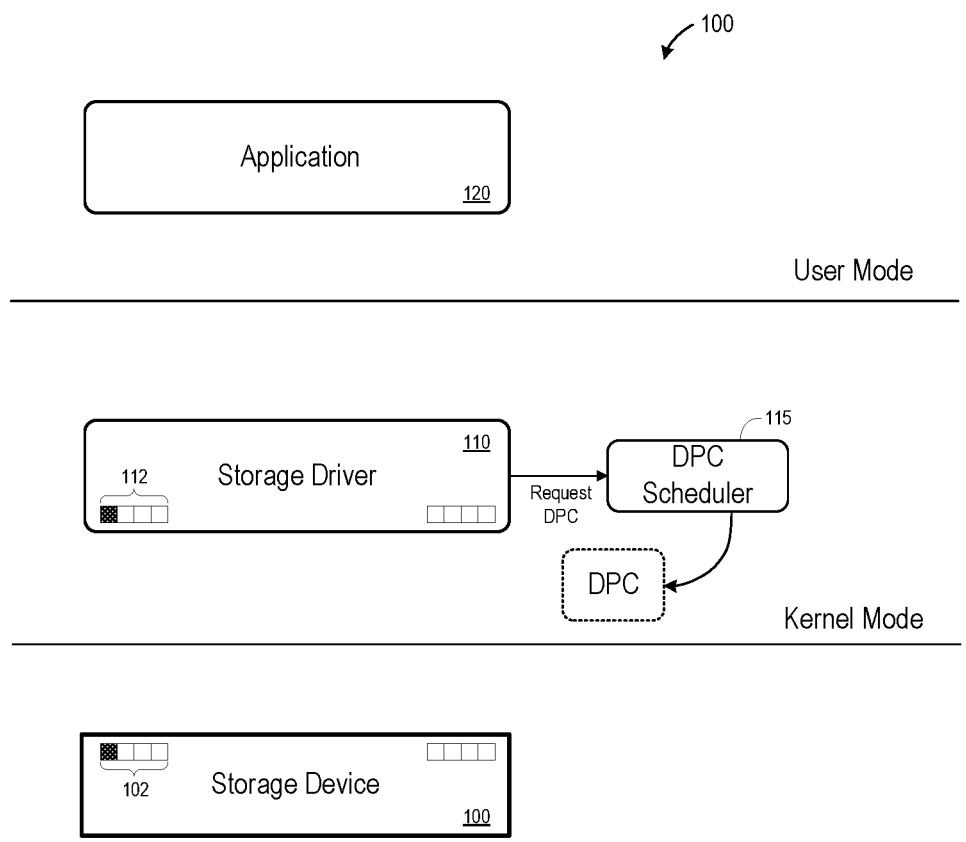
FIG. 7 illustrates operation of a storage driver to reschedule a Deferred Procedure Call according to some embodiments.

Flow cycles at S240 until it is determined, based on CPU state, queue and queue position, to execute the scheduled Deferred Procedure Call. At S250, the executing Deferred Procedure Call determines whether the requested I/O operation is complete. FIG. 6 illustrates S250 according to some embodiments. As shown, the Deferred Procedure Call checks a completion queue 114 which is associated with the original submission queue 112. If the checked completion queue 114 does not indicate that the requested I/O operation is complete, flow returns to S230 to schedule the same Deferred Procedure Call again, as illustrated in FIG. 7.

Figure 8:
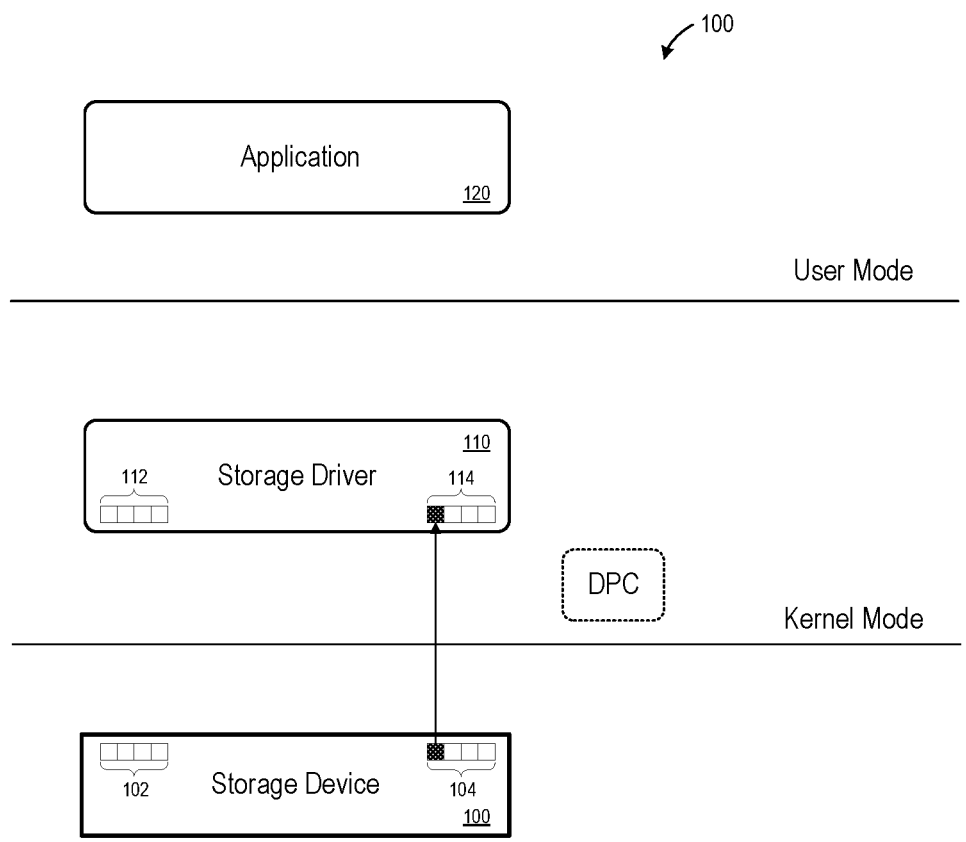
FIG. 8 illustrates completion of an I/O operation according to some embodiments.

FIG. 8 illustrates I/O completion according to some embodiments. In response to completing the I/O request, storage device 100 writes to a corresponding completion queue 104. Storage device 100 also writes an entry into the corresponding completion queue 114 indicating to the operating system that the I/O request is completed.

Figure 9:
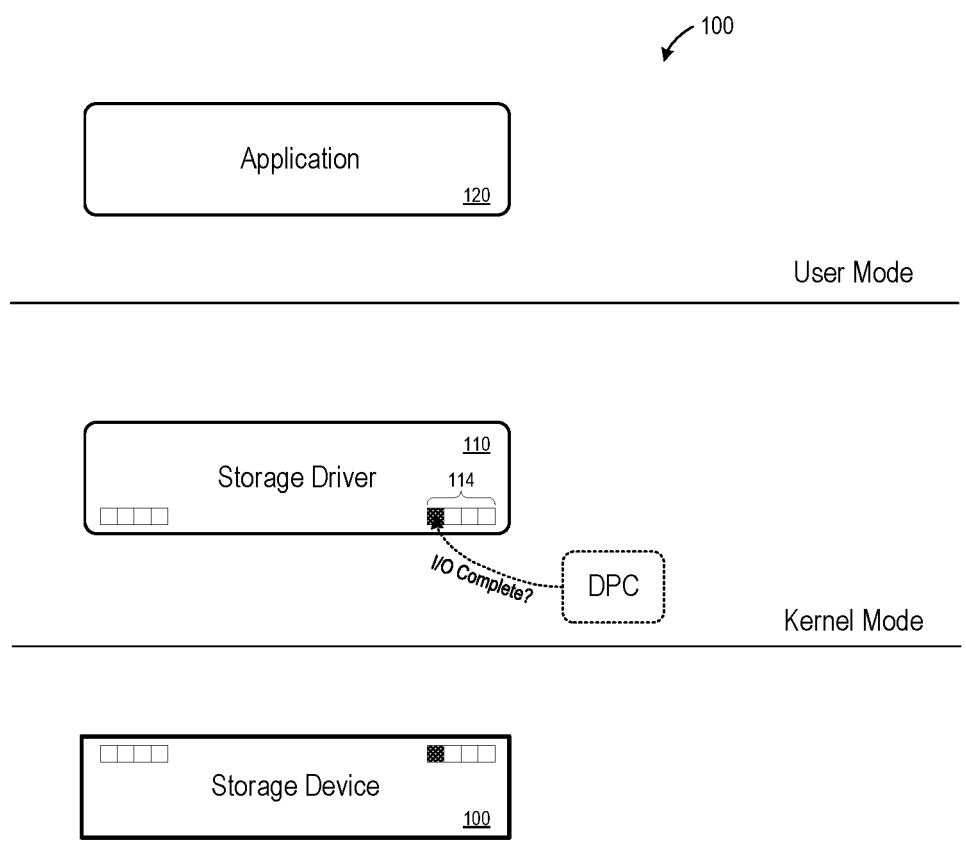
FIG. 9 illustrates operation of a Deferred Procedure Call according to some embodiments.
Figure 10:
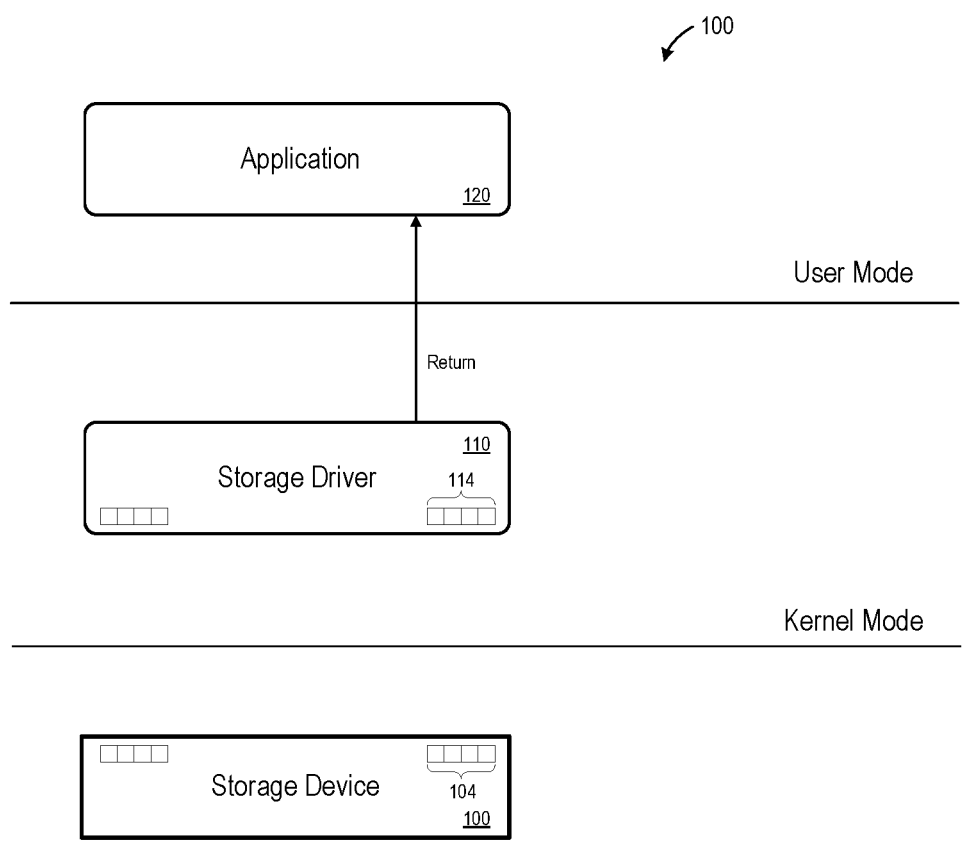
FIG. 10 illustrates completion of an I/O request according to some embodiments.

Returning to process 200, it is assumed that the re-scheduled Deferred Procedure Call is again executed at S250, as illustrated in FIG. 9. At this point, due to the entry in completion queue 114, it is determined that the requested I/O operation is complete. Accordingly, the I/O request is then completed to the requesting application at S260 as illustrated in FIG. 10. The manner in which the request is completed to the requesting application (i.e., what is "returned") may be based on entries written to completion queue 114 as is known in the art.

In some embodiments, S260 may also comprise determining whether the current submission queue is empty (i.e., whether one or more other I/O requests associated with the same CPU are pending). If so, flow may return to S230 to schedule another Deferred Procedure Call. In such an embodiment, process 200 terminates only in a case that no I/O requests are pending in the submission queue. Accordingly, only one Deferred Procedure Call need be scheduled per completion queue. Therefore, if an I/O request is received at a submission queue, and a Deferred Procedure Call is already scheduled with respect to the completion queue corresponding to the submission queue, no Deferred Procedure Call is scheduled at S230.

Although S220 and S230 are described and illustrated as being executed sequentially, these steps may be performed in reverse order or in parallel to any degree.

In some embodiments, no Deferred Procedure Call is scheduled if no I/O request is outstanding, in order to conserve CPU cycles. System resources are also conserved due to the lack of a dedicated polling thread. Some embodiments may provide balanced CPU usage due to CPU-specific Deferred Procedure Call execution.

Figure 11:
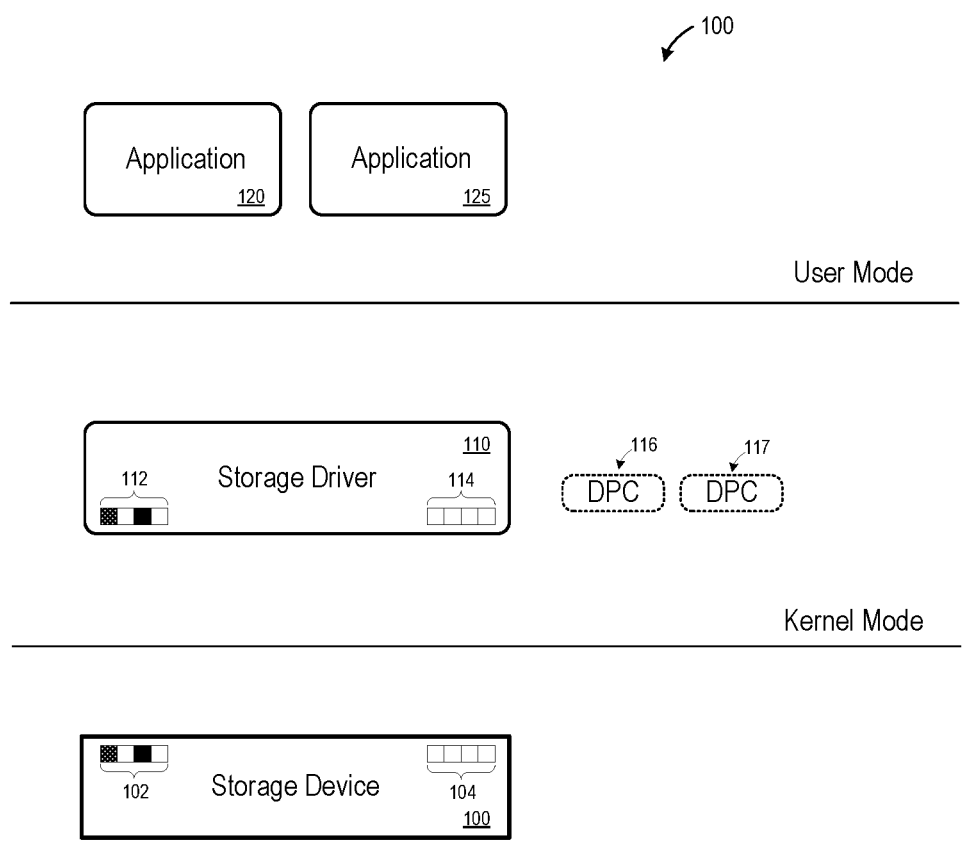
FIG. 11 illustrates a system including I/O requests received from two applications and including two Deferred Procedure Call queues according to some embodiments.

FIG. 11 illustrates system 100 including executing user-mode applications 120 and 125. It is assumed that applications 120 and 125 have each issued I/O requests associated with storage driver 110. Each of applications 120 and 125 are executing on a different CPU, therefore the issued requests are stored in different submission queues 112 and programmed into different corresponding submission queues 102. Moreover, Deferred Procedure Calls have been scheduled into queues 116 and 117, one of which corresponds to a simultaneous multi-threaded processor associated with the CPU executing application 120, and the other of which corresponds to a simultaneous multi-threaded processor associated with the CPU executing application 125.

Figure 12:
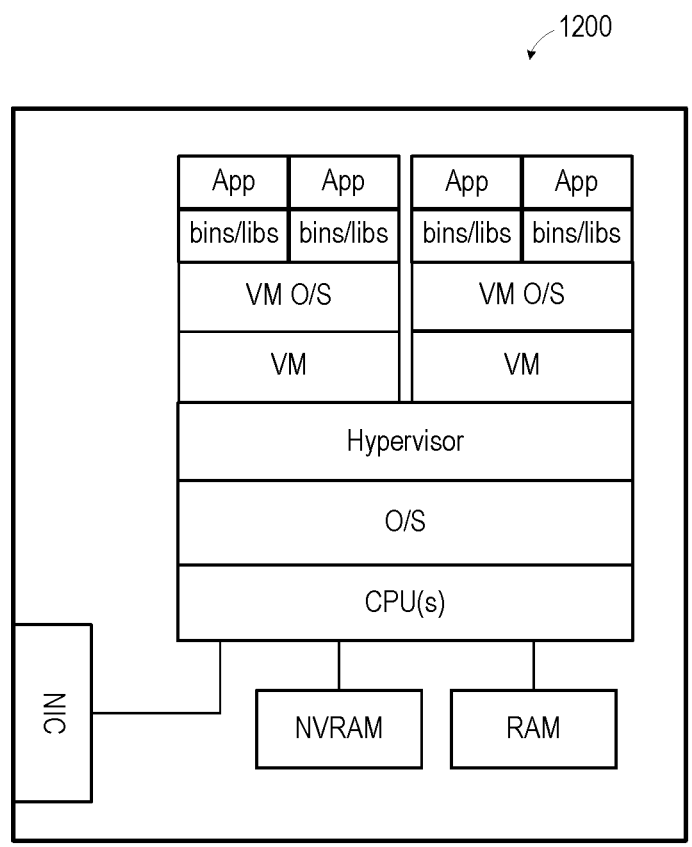
FIG. 12 illustrates a host computing device hosting multiple virtual machines according to some embodiments.

FIG. 12 illustrates computing device 1200 which may implement process 200 according to some embodiments. Computing device 1200 may be a traditional standalone computing device or a blade server. Computing device 1200 includes a NIC that manages communication with an external physical network. One or more CPUs execute a host operating system that supports a hypervisor layer, on which are executed two virtual machines.

Each virtual machine may be configured to utilize a dedicated amount of RAM, persistent storage (e.g., low-latency storage such as NVRAM), and processing resources of computing device 1200. Each virtual machine may execute its own operating system which may be the same or different than the operating system executed by the other virtual machine. Each virtual machine may run one or more applications on its operating system to request I/O operations from NVRAM. These I/O requests may be processed as described above. By doing so, some embodiments provide improved latency and throughput over conventional processing in which an interrupt generated by the storage device would be delivered to a physical CPU, to the Hypervisor layer, and then to a virtual CPU of the requesting application.

Figure 13:
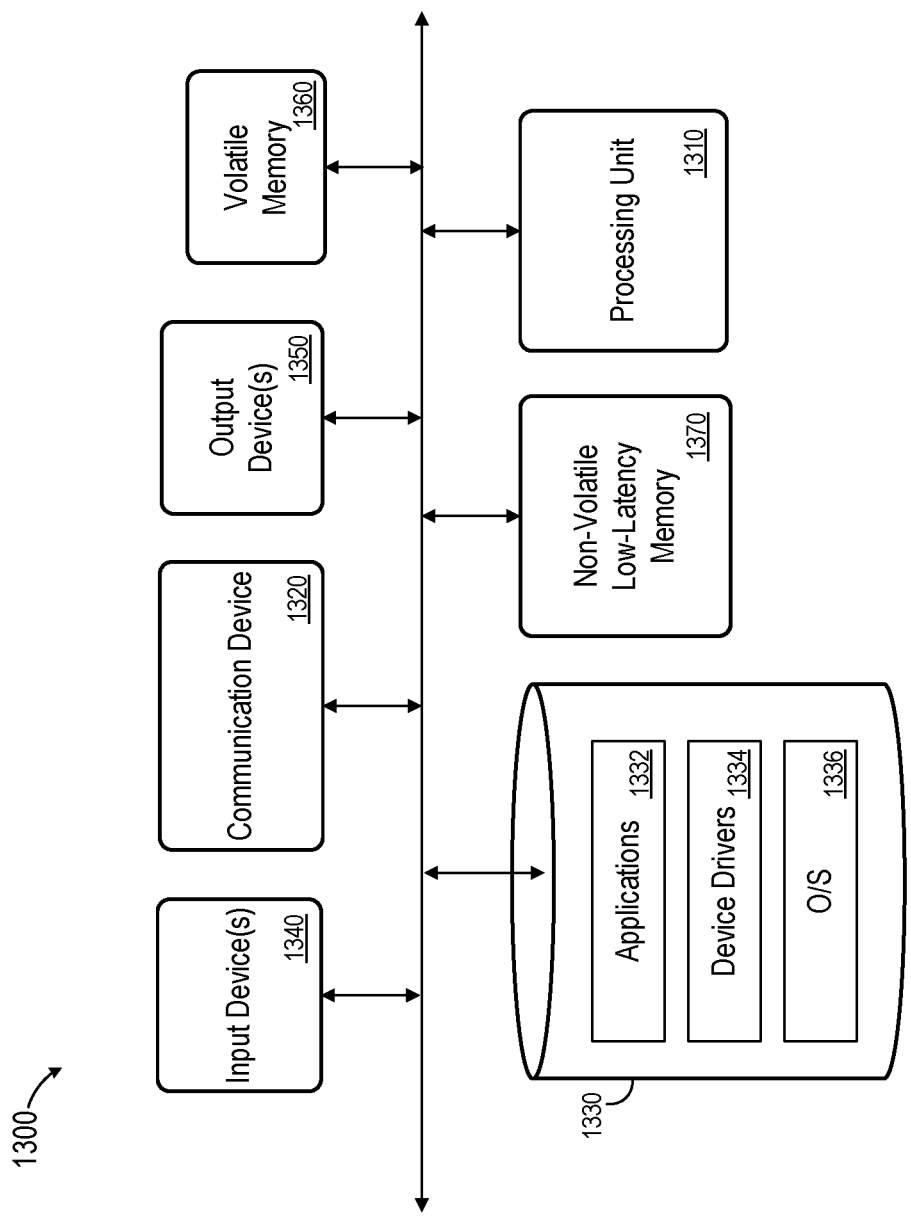
FIG. 13 illustrates a computing system according to some embodiments.

FIG. 13 is a block diagram of system 1300 according to some embodiments. System 1300 may comprise a general-purpose computer server and may execute program code to provide I/O request processing using any of the processes described herein. Any one or more components of system 1300 may be implemented in a distributed architecture. System 1300 may include other unshown elements according to some embodiments.

System 1300 includes processing unit 1310 operatively coupled to communication device 1320, persistent data storage system 1330, one or more input devices 1340, one or more output devices 1350, volatile memory 1360 and low-latency non-volatile memory 1370. Processing unit 1310 may comprise one or more processors, processing cores, processing threads, etc. for executing program code. Communication device 1320 may facilitate communication with external devices, such as client devices requiring application services. Input device(s) 1340 may comprise, for example, a keyboard, a keypad, a mouse or other pointing device, a microphone, a touch screen, and/or an eye-tracking device. Output device(s) 1350 may comprise, for example, a display (e.g., a display screen), a speaker, and/or a printer. Input device(s) 1340 and/or output device(s) 1350 may be coupled to system 1300 as needed and in some cases no such devices are coupled to system 1300 during operation.

Data storage system 1330 may comprise any number of appropriate persistent storage devices, including combinations of magnetic storage devices (e.g., magnetic tape, hard disk drives and flash memory), optical storage devices, Read Only Memory (ROM) devices, etc. Memory 1360 may comprise Random Access Memory (RAM) of any type that is or becomes known. Non-volatile low-latency memory 1370 may comprise Non-Volatile Random Access Memory (NVRAM), Storage Class Memory (SCM) or any other low-latency memory that is or becomes known.

Applications 1332 may comprise program code executed by processing unit 1310 to cause system 1300 to provide functionality and may require I/O services in order to provide such functionality. For example, program code of applications 1332 may be executed to transmit a request for an I/O operation to executing operating system 1336, which provides the request to one of executing device drivers 1334. If the request is associated with non-volatile low-latency memory 1370, the request is received by the one of device drivers 1334 which is associated with memory 1370. Processing may therefore continue as described above to complete the I/O request. Data storage device 1330 may also store data and other program code for providing additional functionality and/or which are necessary for operation of system 1300.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computing system comprising:
   one or more processors executing processor-executable program code; and
   a storage device,
   wherein the system is operable to:
   receive a request to perform an I/O operation;
   provide the request to the storage device;
   store an entry associated with the request in a storage driver submission queue;
   schedule a deferred procedure call associated with an operating system, the deferred procedure call to determine whether the storage device has completed the I/O operation;
   if it is determined that the operating system is at an interrupt request level of the deferred procedure call, execute the deferred procedure call to determine that the storage device has completed the I/O operation; and
   in response to the determination that the storage device has completed the I/O operation, transmit a return corresponding to the completed I/O operation;
   determine whether the storage driver submission queue contains an entry associated with a request to perform a second I/O operation; and
   if it is determined that the storage driver submission queue contains an entry associated with a request to perform a second I/O operation, reschedule the deferred procedure call to determine whether the storage device has completed the second I/O operation.

2. A computing system according to claim 1, wherein the deferred procedure call comprises a procedure to check a storage driver completion queue corresponding to the I/O operation.

3. A computing system according to claim 1, wherein providing of the request to the storage device comprises:
   determination of a processor from which the request was received; and
   determination that the storage driver submission queue is associated with the determined processor.

4. A computing system according to claim 3, wherein the deferred procedure call is scheduled to be executed by a simultaneous multi-threading processor associated with the processor.

5. A computing system according to claim 3, the system further operable to:
   receive a second request to perform a third I/O operation;
   determine a second processor from which the second request was received;
   determine a second storage driver submission queue associated with the determined second processor;
   store a second entry associated with the second I/O request in the determined second storage driver submission queue;
   schedule a second deferred procedure call associated with the operating system, the second deferred procedure call to determine whether the storage device has completed the third I/O operation;
   if it is determined that the operating system is at an interrupt request level of the second deferred procedure call, execute the second deferred procedure call to determine that the storage device has completed the third I/O operation; and,
   in response to the determination that the storage device has completed the third I/O operation,
   transmit a second return corresponding to the completed third I/O operation;
   determine whether the second storage driver submission queue contains an entry associated with a request to perform a fourth I/O operation; and
   if it is determined that the storage driver submission queue contains an entry associated with a request to perform a fourth I/O operation, reschedule the second deferred procedure call to determine whether the storage device has completed the fourth I/O operation.

6. A computing system according to claim 5, wherein the deferred procedure call is scheduled to be executed by a simultaneous multi-threading processor associated with the processor, and
   wherein the second deferred procedure call is scheduled to be executed by a second simultaneous multi-threading processor associated with the second processor.

7. A computing system executing an operating system, a user-mode application, and a storage driver, the computing system to:
   receive, at the storage driver, a request from the user-mode application to perform an I/O operation associated with a storage device;
   provide the request to the storage device;
   store an entry associated with the request in a storage driver submission queue;
   transmit, from the storage driver, a request to the operating system to schedule a deferred procedure call to determine whether the I/O operation is complete;
   determine, by the operating system, that the operating system is at an interrupt request level of the deferred procedure call;
   in response to the determination that the operating system is at an interrupt request level of the deferred procedure call, execute, by the operating system, the deferred procedure call to determine that the I/O operation is complete; and
   in response to the determination that the I/O operation is complete,
   transmit a return corresponding to the completed I/O operation to the user-mode application;

determine whether the storage driver submission queue contains an entry associated with a request to perform a second I/O operation; and if it is determined that the storage driver submission queue contains an entry associated with a request to perform a second I/O operation, reschedule the deferred procedure call to determine whether the second I/O operation is complete.

8. A computing system according to claim 7, wherein the deferred procedure call comprises a procedure to check a completion queue of the storage driver, the completion queue corresponding to the requested I/O operation.

9. A computing system according to claim 7, wherein providing of the request to the storage device comprises:

determination of a processor of the computing system from which the request was received; and determination that the storage driver submission queue is associated with the determined processor.

10. A computing system according to claim 9, wherein the deferred procedure call is scheduled to be executed by a simultaneous multi-threading processor associated with the processor.

11. A computing system according to claim 9, the system further operable to:

receive, at the storage driver, a second request to perform a third I/O operation from a second user-mode application;

determine a second processor from which the second request was received;

determine a second storage driver submission queue which is associated with the determined second processor;

store a second entry associated with the second I/O request in the determined second storage driver submission queue;

transmit, from the storage driver, a second request to the operating system to schedule a second deferred procedure call to determine whether the third I/O operation is complete;

determine, by the operating system, that the operating system is at an interrupt request level of the second deferred procedure call;

in response to the determination that the operating system is at an interrupt request level of the second deferred procedure call, execute, by the operating system, the second scheduled deferred procedure call to determine that the third I/O operation is complete; and in response to the determination that the the third I/O operation is complete, transmit a second return corresponding to the completed third I/O operation to the second user-mode application;

determine whether the second storage driver submission queue contains an entry associated with a request to perform a fourth I/O operation; and if it is determined that the second storage driver submission queue contains an entry associated with a request to perform a fourth I/O operation, reschedule the second deferred procedure call to determine whether the fourth I/O operation is complete.

12. A computing system according to claim 11, wherein the deferred procedure call is scheduled to be executed by a simultaneous multi-threading processor associated with the processor, and wherein the second deferred procedure call is scheduled to be executed by a second simultaneous multi-threading processor associated with the second processor.

13. A computer-implemented method comprising:

receiving a request to perform an I/O operation from a user-mode application;

store an entry associated with the request in a storage driver submission queue;

scheduling a deferred procedure call associated with an operating system, the deferred procedure call to determine whether the I/O operation is complete;

if it is determined that the operating system is at an interrupt request level of the deferred procedure call, executing the scheduled deferred procedure call to determine that the I/O operation is complete; and in response to the determination that the I/O operation is complete, transmitting a return corresponding to the completed I/O operation to the user-mode application;

determining whether the storage driver submission queue contains an entry associated with a request to perform a second I/O operation; and if it is determined that the storage driver submission queue contains an entry associated with a request to perform a second I/O operation, reschedule the deferred procedure call to determine whether the second I/O operation is complete.

14. A computer-implemented method according to claim 13, wherein the deferred procedure call comprises a procedure to check a storage driver completion queue corresponding to the I/O operation.

15. A computer-implemented method according to claim 13, further comprising:

determining a processor from which the request was received; and determining that the storage driver submission queue is associated with the determined processor.

16. A computer-implemented method according to claim 15, further comprising:

receiving a second request to perform a third I/O operation from a second user-mode application;

determining a second processor from which the second request was received;

determining a second storage driver submission queue associated with the determined second processor;

storing a second entry associated with the second request in the determined second storage driver submission queue;

scheduling a second deferred procedure call associated with the operating system, the second deferred procedure call to determine whether the third I/O operation is complete;

if it is determined that the operating system is at an interrupt request level of the second deferred procedure call, executing the scheduled second deferred procedure call to determine that the third I/O operation is complete; and in response to the determination that the third I/O operation is complete, transmitting a second return corresponding to the completed third I/O operation to the second user-mode application;

determine whether the second storage driver submission queue contains an entry associated with a request to perform a fourth I/O operation; and if it is determined that the storage driver submission queue contains an entry associated with a request to perform a fourth I/O operation, reschedule the deferred procedure call to determine whether the fourth I/O operation is complete.

17. A computer-implemented method according to claim 16, wherein the deferred procedure call is scheduled to be executed by a simultaneous multi-threading processor associated with the processor, and
wherein the second deferred procedure call is scheduled to be executed by a second simultaneous multi-threading processor associated with the second processor.

* * * * *